US009038962B2

(12) United States Patent
Akers et al.

(10) Patent No.: US 9,038,962 B2
(45) Date of Patent: May 26, 2015

(54) SYSTEM AND METHOD FOR AIRCRAFT INCIDENT MITIGATION

(76) Inventors: David J. Akers, University Heights, OH (US); Gregory P. Temel, Shaker Heights, OH (US); Carrie Ann Temel, legal representative, Shaker Heights, OH (US)

( * ) Notice: Subject to any disclaimer, the term of this patent is extended or adjusted under 35 U.S.C. 154(b) by 841 days.

(21) Appl. No.: 11/106,871

(22) Filed: Apr. 15, 2005

(65) Prior Publication Data

US 2006/0032987 A1 Feb. 16, 2006

Related U.S. Application Data

(63) Continuation of application No. 10/245,064, filed on Sep. 17, 2002, now abandoned.

(60) Provisional application No. 60/322,867, filed on Sep. 17, 2001.

(51) Int. Cl.
*B64C 13/20* (2006.01)
*G08B 25/00* (2006.01)
*B64D 45/00* (2006.01)

(52) U.S. Cl.
CPC .......... *G08B 25/001* (2013.01); *B64D 45/0015* (2013.01); *B64D 2045/0045* (2013.01); *B64D 2045/0055* (2013.01)

(58) Field of Classification Search
USPC ........................ 244/75 R, 76 R, 175, 189, 190
See application file for complete search history.

(56) References Cited

U.S. PATENT DOCUMENTS 3,680,499 A * 8/1972 Boudreau ....................... 109/32
3,704,845 A 12/1972 Ord
3,811,643 A 5/1974 Pizzo
4,726,550 A * 2/1988 Chen et al. ................. 244/137.2
4,811,230 A 3/1989 Graham
5,057,834 A 10/1991 Nordstrom
5,503,059 A 4/1996 Pacholok
5,531,402 A 7/1996 Dahl
5,695,157 A 12/1997 Coirier
5,995,014 A * 11/1999 DiMaria ...................... 340/5.52
6,119,096 A * 9/2000 Mann et al.
6,246,320 B1 6/2001 Monroe
6,253,064 B1 6/2001 Monroe
6,267,039 B1 7/2001 Czarnecki
6,405,107 B1 * 6/2002 Derman ........................... 701/3
6,526,337 B2 * 2/2003 Gardner ........................... 701/3
6,641,087 B1 11/2003 Nelson
6,674,367 B2 * 1/2004 Sweatte ...................... 340/573.1
6,771,186 B1 8/2004 Boveja

* cited by examiner

*Primary Examiner* — Christopher P Ellis
(74) *Attorney, Agent, or Firm* — Amin, Turocy & Watson, LLP

(57) ABSTRACT

A system and method for mitigating an aircraft incident is provided. The invention includes an aircraft panic component coupled to a terminal component. The aircraft panic component facilitates identification of a panic situation and communicates information associated with the panic situation to the terminal component. The aircraft panic component is further operative to at least partially disable a navigation system and/or operational system of an aircraft. The aircraft can then be sent to a safe zone, navigated remotely and/or a course of action for the aircraft can be determined. A safe zone component is adapted to facilitate identification of a course of action for the aircraft based at least in part upon aircraft positional information, aircraft condition information and/or aircraft resource(s). Further, aircraft navigational information and/or aircraft operational information can be sent via an aircraft communication component to a remote system having a remote communication component and a remote analyzing component facilitating transfer of information related to navigational and/or operational system(s) of the aircraft.

18 Claims, 12 Drawing Sheets

SYSTEM AND METHOD FOR AIRCRAFT INCIDENT MITIGATION

CROSS-REFERENCE TO RELATED APPLICATIONS

This application is a continuation of U.S. Application Serial No. 10/245,064, entitled System and Method for Aircraft Incident Mitigation and filed on Sept. 17, 2002 which claims priority to U.S. Provisional Application Serial No. 60/322,867 entitled SYSTEM AND METHOD FOR AIRCRAFT INCIDENT MITIGATION and filed on Sept. 17, 2001. The U.S. Application Serial No. 10/245,064 is incorporated herein by reference.

TECHNICAL FIELD

The present invention relates to the field of systems and methods for aircraft incident mitigation.

BACKGROUND OF THE INVENTION

As demonstrated by the recent hijacking of commercial aircraft and the tragic consequences resulting therefrom, there is a need for systems and methods for mitigating aircraft incidents in the future.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for mitigating an aircraft incident. According to an aspect of the present invention, a system is provided having an aircraft panic component coupled to a terminal component. The aircraft panic component facilitates identification of a panic situation and communicates information associated with the panic situation to the terminal component. The aircraft panic component is further operative to, at least partially, disable a navigation system(s) and/or operational system(s) of an aircraft.

Another aspect of the present invention provides for the aircraft panic component to have at least one panic device (e.g., button and/or switch). The panic device signals a panic situation to the aircraft panic component. The aircraft panic component can communicate the panic situation to an aircraft navigation component. The aircraft navigation component can, at least partially, disable the navigation system of the aircraft. Optionally, in a panic situation, an aircraft operational component can, at least partially, disable the operational system(s) of the aircraft.

Yet another aspect of the present invention provides for a safe zone component. The safe zone component can be part of the aircraft panic component, the terminal component, a remote component or a combination thereof. The safe zone component can utilize aircraft positional information, aircraft condition information and/or aircraft resource(s) (e.g., fuel level) to determinate a course of action for the aircraft in a panic situation.

Another aspect of the present invention provides for aircraft navigational information and/or aircraft operational information to be sent via an aircraft communication component to a remote system having a remote communication component and a remote analyzing component facilitating transfer of information related to navigational and/or operational system(s) of the aircraft.

Yet other aspects of the present invention provides for methods for mitigating an aircraft incident, a computer readable medium having computer executable instructions for mitigating an aircraft incident and a data packet adapted to be transmitted between two or more computer processes related to mitigating an aircraft incident.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
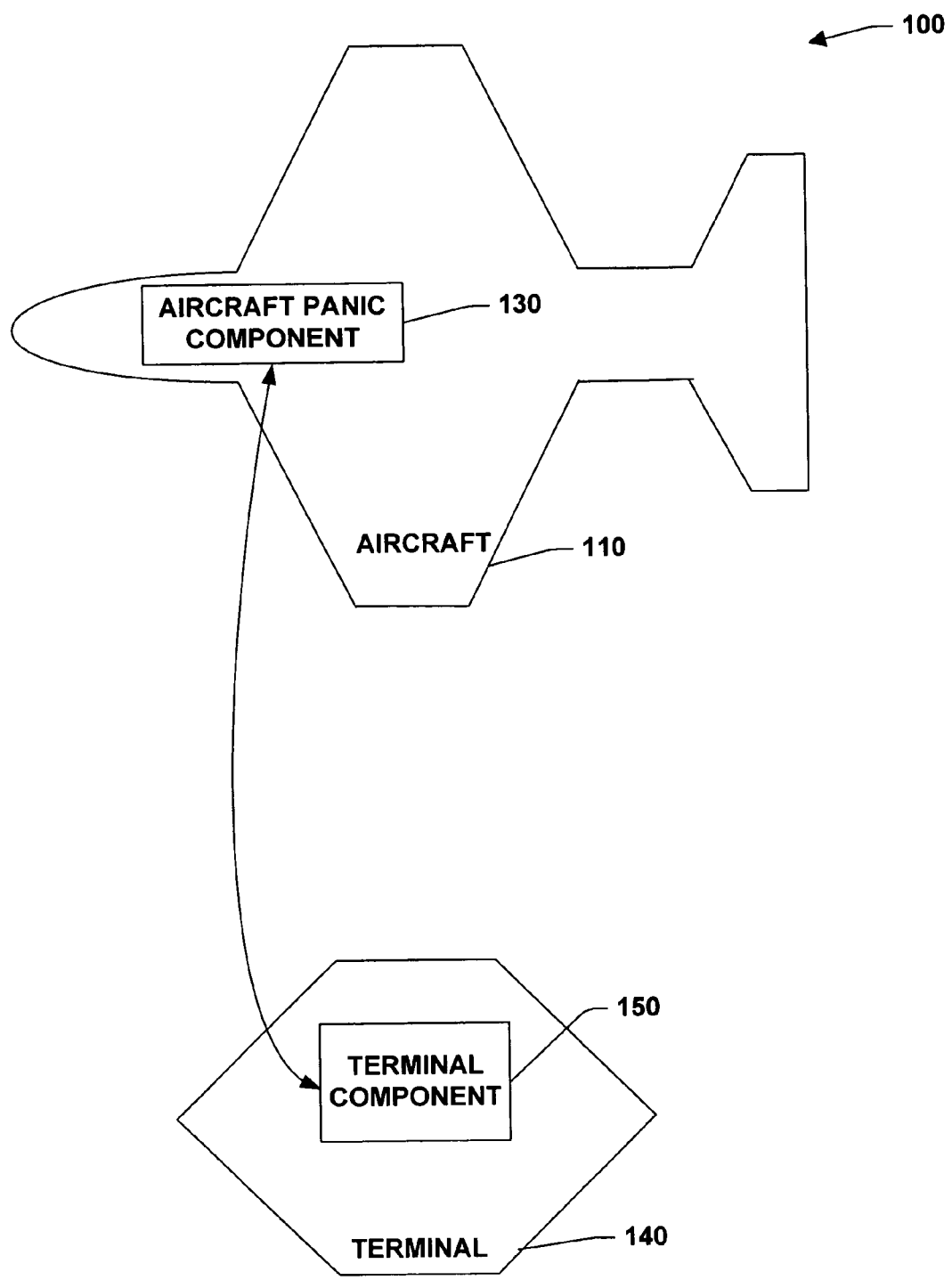
FIG. 1 is a schematic block diagram of an aircraft incident mitigation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Referring to FIG. 1, a system for mitigating an aircraft incident 100 is illustrated. The system 100 includes an aircraft 110, an aircraft panic component 130, a terminal 140 and a terminal component 150. The terminal 140 can include an air traffic control system (not shown), air traffic controller(s) (not shown) and/or other system(s) and component(s) related to air traffic control and/or navigation of aircraft. The aircraft 110 can include a commercial, military and/or other aircraft system having at least one human aboard.

The aircraft panic component 130 facilitates identification of a panic situation. For example, a button, switch or other input device can be located in the cockpit, cabin and/or galley of the aircraft 1 10. In the event of a panic situation, such as a hijacking, a pilot and/or crew member can activate the button, switch other input device in order to identify a panic situation to the aircraft panic component 130. Once notified of a panic situation, the aircraft panic component 130 can at least partially disable the navigation system of the aircraft 110 and/or other operational functions of the aircraft 110 (e.g., fuel, airflow, fuel control and/or mix of breathable air). For example, the aircraft 110 can have its auto-pilot engaged taking the aircraft 110 (e.g., taking the aircraft to a certain altitude and/or heading), placed on a certain flight plan (e.g., toward a specific location), the aircraft 110 can have its auto-pilot temporarily engaged until control of the aircraft 110 is obtained remotely (e.g., by remote person and/or system) and/or navigated remotely (e.g., by a panic situation control center). Once the aircraft panic component 130 has been notified of a panic situation, navigation of the aircraft 110 cannot return back to "normal" (e.g., returning the at least partially disabled navigation system to control of the pilot) without receiving an appropriate signal and/or message from the terminal component 150. Accordingly, the decision to return the aircraft 110 to "normal" is taken away from the pilot. For example, control of substantially all of the navigational and/or operational system(s) can be taken away from the pilot and not returned to the pilot until and unless a signal and/or message has been received from the terminal component 150.

In accordance with an aspect of the present invention, during a panic situation, navigation system(s) and/or operational system(s) of the aircraft 110 can be operated remotely. For example, full control of the navigation system(s) and/or operational system(s) of the aircraft 110 can be turned over to remote person(s) and/or system(s) (e.g, land-based pilot and/or system). Alternatively, limited control of the navigation system(s) and/or operational system(s) of the aircraft 110 can be turned over to a remote person(s) and/or system(s) (e.g., land-based pilot and/or system). Further, while in a panic situation, it is to be appreciated the aircraft 110 can be landed remotely (e.g., without intervention of a pilot physically located within the aircraft 110).

The terminal component 150 is adapted to receive information (e.g., related to a panic situation) from the aircraft panic component 130. Optionally, the terminal component 150 can further be adapted to send information to the aircraft panic component 130 (e.g., return navigation to normal signal and/or message). The terminal component 150 can receive information from a human operator (e.g., air traffic controller) and/or computer system(s) (not shown). It is to be appreciated that in accordance with an aspect of the present invention, during flight, the aircraft 110 can be in contact with one or a plurality of terminal(s) 150 (e.g., airport terminal(s), panic situation control center(s), NORAD, SAC and/or other flight control center(s)).

Figure 2:
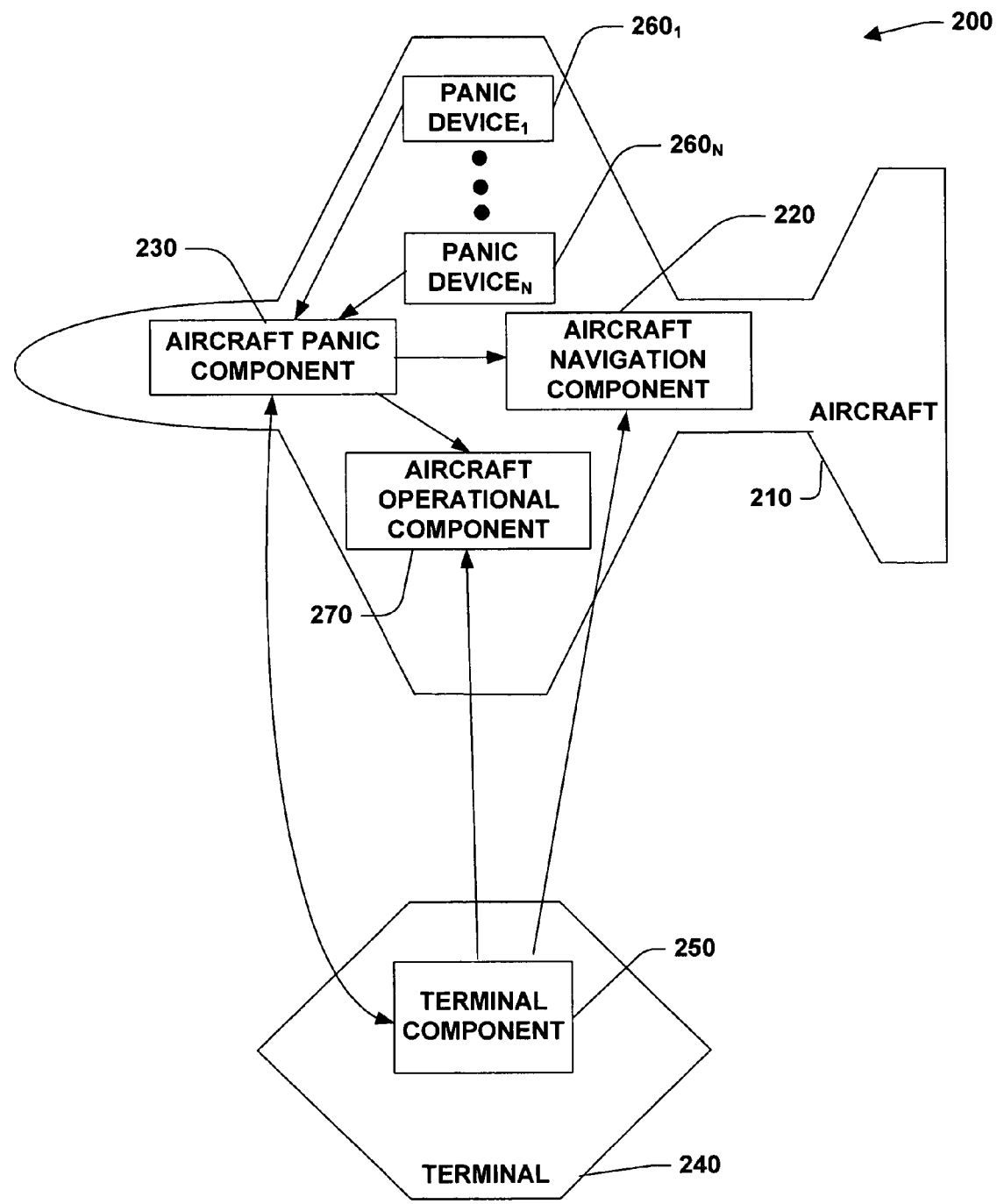
FIG. 2 is a schematic block diagram of an aircraft incident mitigation system in accordance with an aspect of the present invention.

Next, referring to FIG. 2, a system for mitigating an aircraft incident 200 is illustrated. The system 200 includes an aircraft 210, an aircraft navigation component 220, an aircraft panic component 230, a terminal 240, a terminal component 250 and a first panic device $260_1$ through an Nth panic device $260_N$, N being an integer greater to or equal to one. The panic devices $260_1$ through $260_N$ can be referred to collectively as the panic device 260. The terminal 240 can include an air traffic control system (not shown), air traffic controller(s) (not shown) and/or other system(s) and component(s) related to air traffic control and/or navigation of aircraft. The aircraft 210 can include a commercial, military and/or other aircraft system having at least one human aboard.

The aircraft navigation component 220 facilitates navigation of the aircraft 210. For example, the aircraft navigation component 220 can include the computer, electronic, electrical, hydraulic and/or pneumatic control system(s) comprising the navigational system of the aircraft 210.

Optionally, the aircraft 210 can include an aircraft operational component 270 which facilitates operational system(s) (e.g., fuel, pneumatic control, hydraulic and/or air pressure) of the aircraft 210.

The aircraft panic component 230 facilitates identification of a panic situation. Once notified of a panic situation, the aircraft panic component 230 can communicate the panic situation to the aircraft navigation component 220 which can at least partially disable the navigation system of the aircraft 210. Optionally, the aircraft panic component 230 can communicate the panic situation to the aircraft operational component 270. Further, the aircraft panic component can communicate information associated with the panic situation to the terminal component 250 (e.g., identify panic situation to air traffic controller). Based upon at least in part upon communication of the panic situation from the aircraft panic component 230, the aircraft navigation component 220 can place the aircraft 210 into appropriate safe zone (e.g., specific altitude, for example, 37,000 feet) which can be a restricted airspace, on a certain flight plan (e.g., toward a specific location) and/or permit the aircraft 210 to be navigated remotely (e.g., by a panic situation control center). Further, the aircraft operational component 270 can, optionally, facilitate placing one, some or substantially all of the aircraft operational system(s) to a predetermined state and/or a state based at least in part upon information received from the terminal component 250. Once the aircraft panic component 230 has been notified of a panic situation and communicated the panic situation to the aircraft navigation component 220, navigation of the aircraft 210 cannot return back to "normal" (e.g., returning the at least partially disabled navigation system to control of the pilot) without receiving an appropriate signal and/or message from the terminal component 250. Accordingly, the decision to return the aircraft 210 to "normal" is taken away from the pilot. Further, optionally, operation of the aircraft operational system(s) can likewise not be returned to "normal" without receiving an appropriate signal and/or message from the terminal component 250.

The terminal component 250 is adapted to receive information (e.g., related to a panic situation) from the aircraft panic component 230. Optionally, the terminal component 250 can further be adapted to send information to the aircraft panic component 230 (e.g., return navigation to normal signal and/or message). The terminal component 250 can receive information from a human operator (e.g., air traffic controller), computer system(s) (not shown), military control center(s) and/or military computer system(s).

The panic device 260 can include a button, switch, iris scanner, thumb print reader and the like. In the event of a panic situation, such as a hijacking, a pilot and/or crew member can activate the panic device 260 in order to identify a panic situation to the aircraft panic component 230. It is to be appreciated that in accordance with the present invention, the panic device 260 can be coupled to the aircraft panic component 230 is a variety ways. For example, the panic device 260 can be electrically, wirelessly (e.g., via radio waves and/or infrared communication), pneumatically and/or hydraulically coupled to the aircraft panic component 260. It is to be understood and appreciated that the present invention is not limited by these examples and that any appropriate manner of identifying a panic situation to the aircraft panic component 230 is encompassed by this invention. In a system 200 comprising more than one panic device 260, the aircraft panic component 230 can determinate a panic situation has occurred based upon receiving a signal from a single panic device 260, a predetermined number of signals from panic devices 260 or receiving signals from all panic devices 260.

The panic device 260 can be located in the cockpit, galley and/or cabin. For example, a panic device 260 could be located at one, some or substantially all passenger seats. For example, a panic device 260 located at a passenger seat could signal a pre-panic situation requiring a crew member to override the pre-panic situation signal (e.g., within a predetermined period of time). If the crew member override is not performed timely, a panic situation is signaled. Further, a sky marshal can be equipped with a wireless (e.g., handheld) panic device 260.

Figure 3:
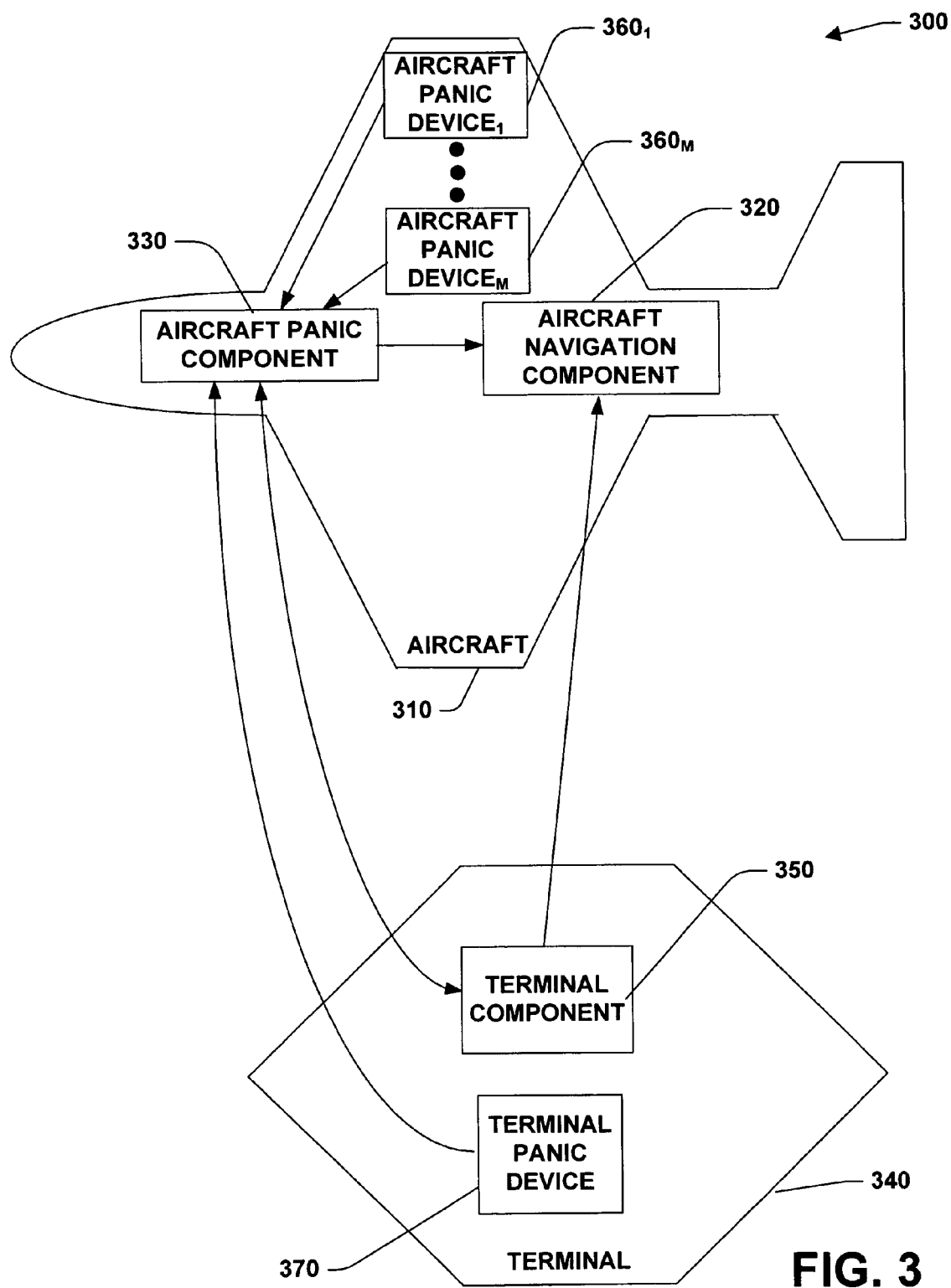
FIG. 3 is a schematic block diagram of an aircraft incident mitigation system in accordance with an aspect of the present invention.

Turning to FIG. 3, a system for mitigating an aircraft incident 300 is illustrated. The system 300 includes an aircraft 310, an aircraft navigation component 320, an aircraft panic component 330, a terminal 340, a terminal component 350 and a terminal panic device 370. Optionally, the system 300 can include an aircraft panic device $360_1$ through an Mth panic device $360_M$, M being an integer greater to or equal to one. The panic devices $360_1$ through $360_M$ can be referred to collectively as the panic device 360. The terminal 340 can include an air traffic control system (not shown), air traffic controller(s) (not shown) and/or other system(s) and component(s) related to air traffic control and/or navigation of aircraft. The aircraft 310 can include a commercial, military and/or other aircraft system having at least one human aboard.

The aircraft panic component 330 facilitates identification of a panic situation. The aircraft panic component 330 can obtain information related to the panic situation from the terminal panic device 370 and/or the aircraft panic device 360. Accordingly, a panic situation can be initiated from the aircraft 310 and/or the terminal 340. For example, an air traffic controller can initiate a panic situation utilizing a terminal panic device 370 (e.g., button and/or switch) if an improper response (e.g., voice code, unrecognized voice, message and/or signal) is received from the aircraft 310. Once notified of a panic situation, the aircraft panic component 330 can communicate the panic situation to the aircraft navigation component 320 which can at least partially disable the navigation system of the aircraft 310. Further, the aircraft panic component can communicate information associated with the panic situation to the terminal component 350 (e.g., identify panic situation to air traffic controller). Based upon at least in part upon communication of the panic situation from the aircraft panic component 330, the aircraft navigation component 320 can place the aircraft 310 into appropriate safe zone (e.g., specific altitude), on a certain flight plan (e.g., toward a specific location) and/or permit the aircraft 310 to be navigated remotely (e.g., by a panic situation control center). Once the aircraft panic component 330 has been notified of a panic situation and communicated the panic situation to the aircraft navigation component 320, navigation of the aircraft 310 cannot return back to "normal" (e.g., returning the at least partially disabled navigation system to control of the pilot) without receiving an appropriate signal and/or message from the terminal component 350. Accordingly, the decision to return the aircraft 310 to "normal" is taken away from the pilot.

Figure 4:
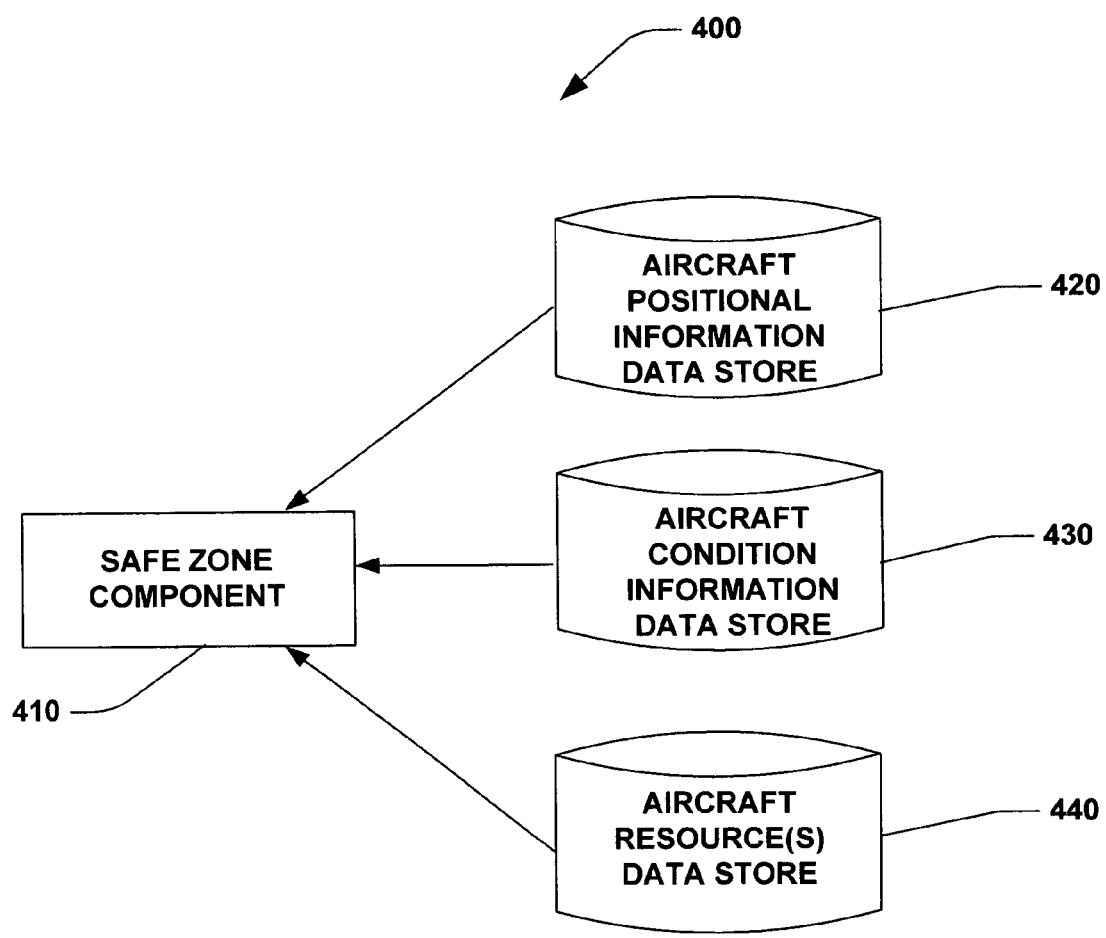
FIG. 4 is a schematic block diagram of a safe zone component in accordance with an aspect of the present invention.

Turning to FIG. 4, a safe zone component 410 in accordance with an aspect of the present invention is illustrated. The safe zone component 410 includes aircraft positional information data store 420, aircraft condition information data store 430 and/or aircraft resource(s) data store 440.

The aircraft positional information data store 420 can store information associated with the geographical location and/or altitude of the aircraft.

The aircraft condition information data store 430 can store information associated with condition(s) of various component(s) of the aircraft. For example, the aircraft condition information data store 430 can store information (e.g., intact, temperature, pressure) with structural integrity of various parts of the aircraft (e.g., tail, wings, cargo hold, cockpit, cabin and/or galley). For example, the aircraft condition information data store 430 can store a most recent temperature and/or pressure of the cabin (e.g., received from appropriate sensor(s) (not shown).

The aircraft resource(s) data store 440 can store information associated with condition(s) of resource(s) of the aircraft. For example, the aircraft resource(s) can store information associated with fuel level(s).

The safe zone component 410 can be adapted to facilitate identification of a course of action for the aircraft in a panic situation. The safe zone component 410 can determine an appropriate safe zone (e.g., specific altitude), flight plan (e.g., toward a specific location) and/or permit the aircraft to be navigated remotely (e.g., by a panic situation control center). The safe zone component 410 can further have information related to geography and/or topology, for example, facilitating identification of air port(s) physically near the aircraft during the panic situation. For example, the safe zone component 410 can determine a course of action for the aircraft based at least in part upon aircraft positional information data store 420, aircraft condition information data store 430 and/or aircraft resource(s) data store 440.

Figure 5:
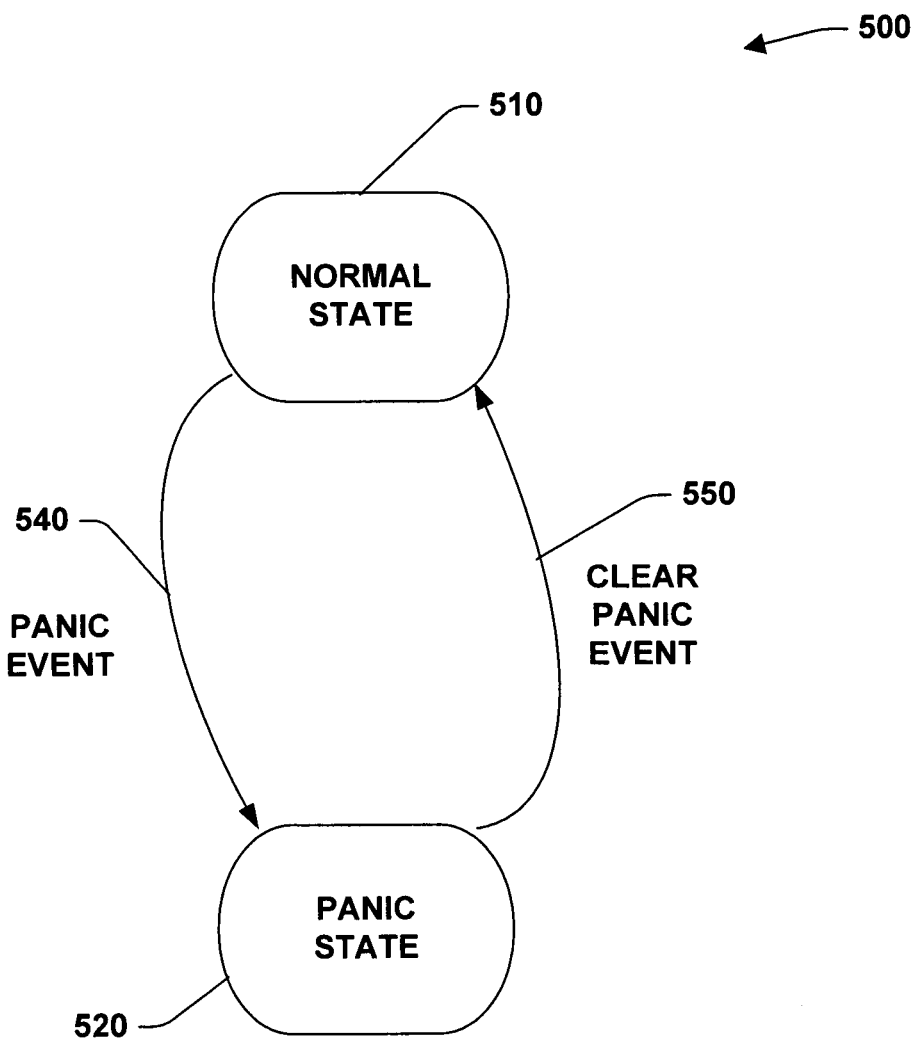
FIG. 5 is a state diagram in accordance with an aspect of the present invention.

Referring next to FIG. 5, a state diagram of an aircraft incident mitigation system 500 in accordance with an aspect of the present invention is illustrated. As illustrated in the example of FIG. 5, an aircraft can have one of two states: normal state 510 and panic state 520. During general operation, the aircraft is in the normal state 510. In the event of a panic event 440 (e.g., hijacking), the aircraft is placed into the panic state 520. The aircraft does not return to the normal state 510 until and unless a clear panic event 550 occurs (e.g., an appropriate signal and/or message received from a terminal component).

Figure 5A:
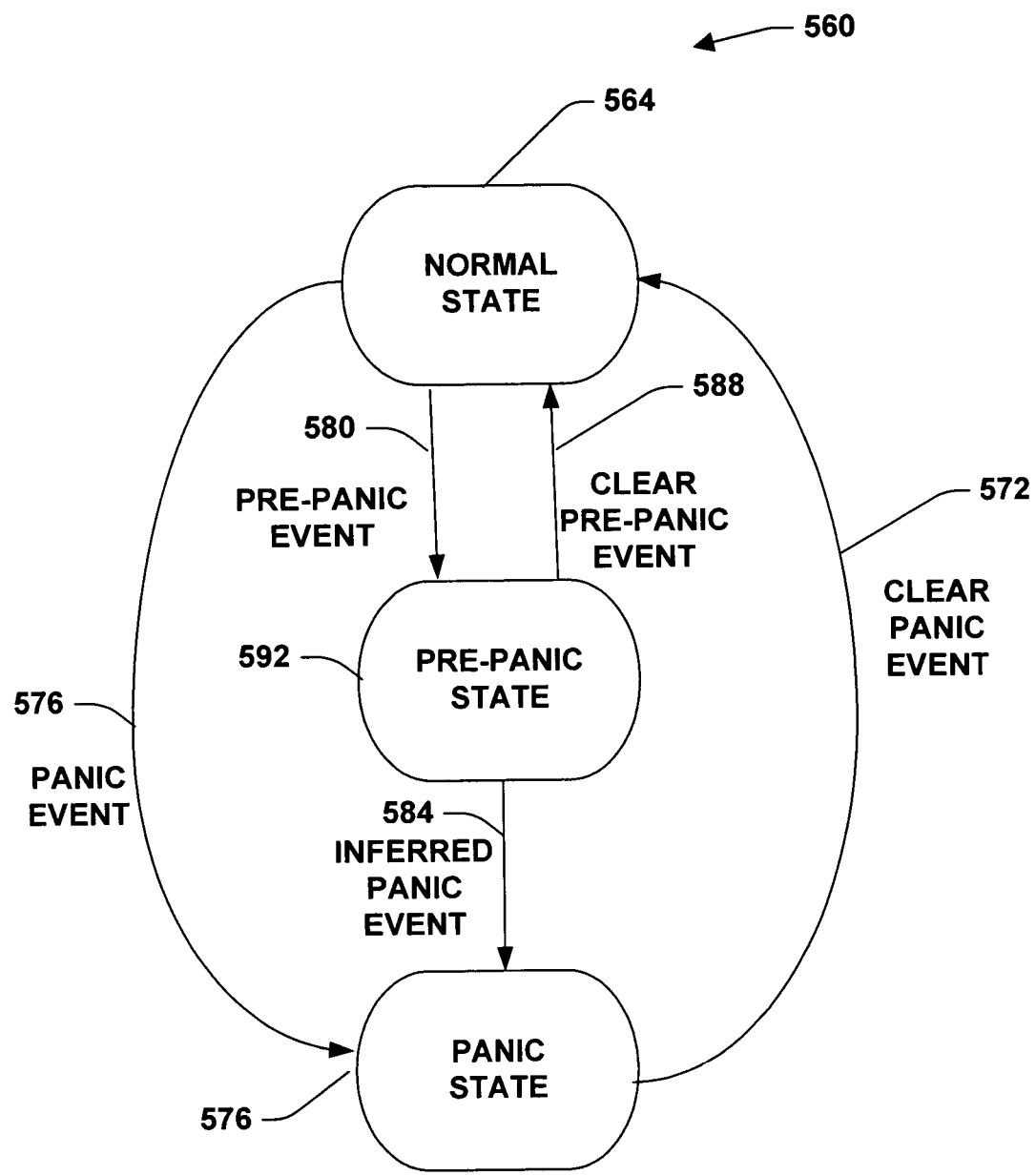
FIG. 5a is a state diagram in accordance with an aspect of the present invention.

Next, referring to FIG. 5a, a state diagram of an aircraft incident mitigation system 560 in accordance with an aspect of the present invention is illustrated. As illustrated in the example of FIG. 5a, an aircraft can have one of three states: normal state 564, pre-panic state 592 and panic state 576. During general operation, the aircraft is in the normal state 564. In the event of a panic event 576 (e.g., hijacking), the aircraft is placed into the panic state 576 (e.g., by a crew member). The aircraft does not return to the normal state 564 until and unless a clear panic event 572 occurs (e.g., an appropriate signal and/or message received from a terminal component). Additionally, the aircraft can be placed in the pre-panic state 592 by a pre-panic event 580, for example, a pre-panic signal received from a passenger panic device. Once placed in the pre-panic state 592 affirmative action is required (e.g., by a crew member) in a predetermined period of time—a clear pre-panic event 588—canceling the pre-panic event 580. In the event the clear pre-panic event 588 is not timely received, the aircraft is placed into the panic state 592 by an inferred panic event 584.

It is to be appreciated that in accordance with the present invention an aircraft can be placed into additional states, for example, panic alert state and/or restricted state. These additional states can depend, for example, upon local, regional, national and/or global emergencies. These additional states can further depend upon information from governmental (e.g., Federal Aviation Authority), military (e.g., Army, Navy, Air Force and/or Marines) and/or civilian entities.

Figure 6:
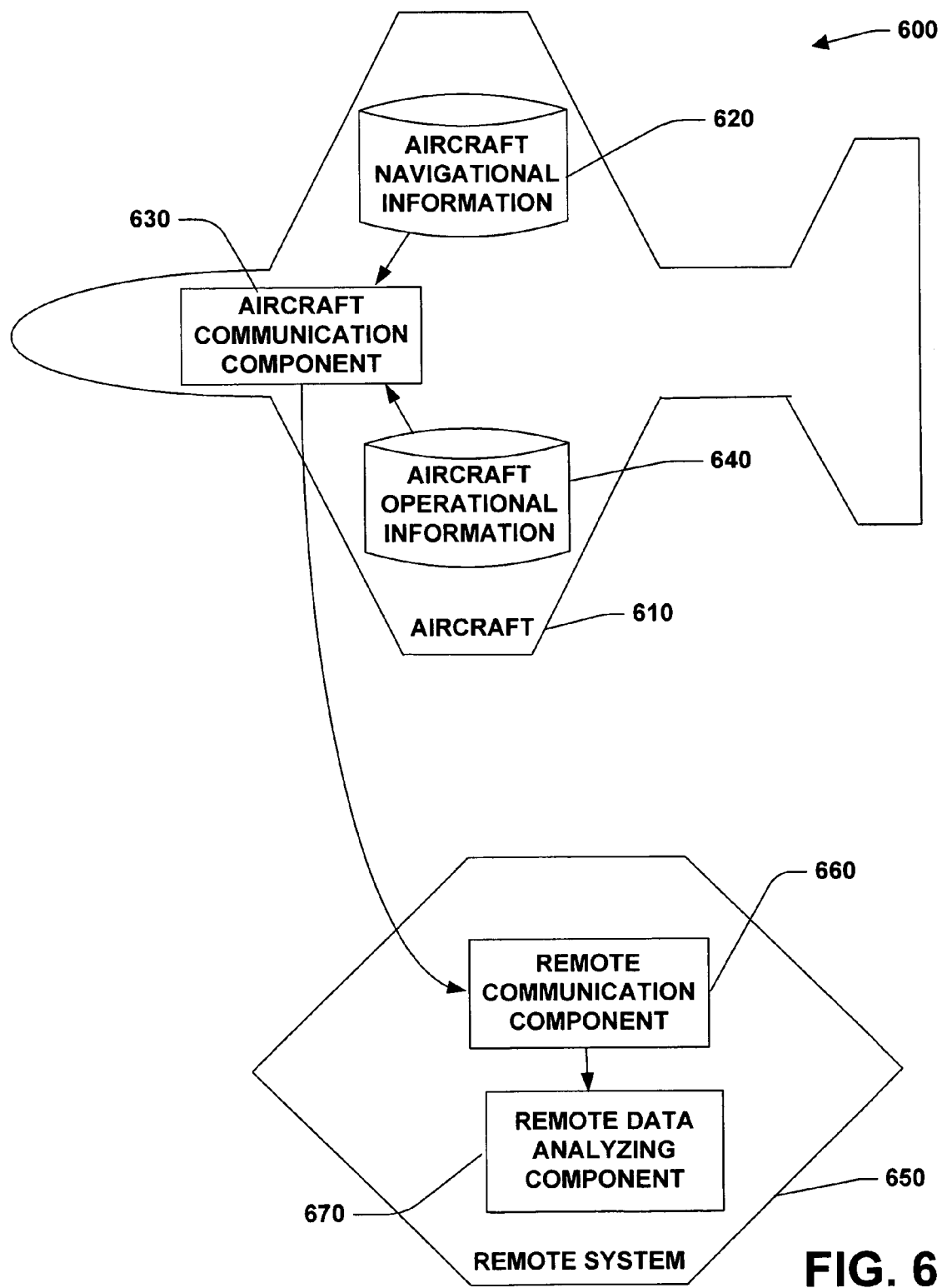
FIG. 6 is a schematic block diagram of an aircraft incident mitigation system in accordance with an aspect of the present invention.

Turning to FIG. 6, a system for a mitigating aircraft incident 600 in accordance with an aspect of the present invention is illustrated. The system 600 includes an aircraft 610 coupled to a remote system 650. The aircraft 610 includes an aircraft communication component 630 facilitating transfer of information related to the aircraft to the remote system 650. The aircraft communication component 630 can be coupled to aircraft navigation information 620 and/or aircraft operational information 640.

The aircraft navigation information 620 can include information associated with navigation of the aircraft 610. The aircraft navigation information can include a log, database and/or other data store of navigation information, for example, a time-stamped record of airspeed and/or heading(s). The aircraft operational information 640 can include information associated with operation of the aircraft 610. The aircraft operational information can include a log, database and/or other data store of operational information, for example, fuel usage, an amount of fuel remaining, airflow, fuel control, mix of breathable air, cabin temperature(s).

The aircraft communication component 630 can further be adapted to communicate additional information to the remote system 650. For example, the aircraft communication component 630 can transfer image(s) and/or streaming video of the cockpit, cabin, galley, cargo hold and/or other area(s) of the aircraft 610.

The remote system 650 can include a remote communication component 660 facilitating transfer of information from the aircraft 610. The remote system 650 can further include a remote analyzing component 670 for analyzing information associated with the aircraft 610.

It is to be appreciated that information communicated from the aircraft communication component 630 and the remote communication component 660 can be performed at regular interval(s), at the request of the remote system 650, at the request of a pilot (not shown) and/or once a panic situation has occurred. By receiving information associated with the aircraft 610 (e.g., navigational and/or operational), remote person(s) and/or system(s) can be better equipped to handle aircraft panic situations.

Figure 7:
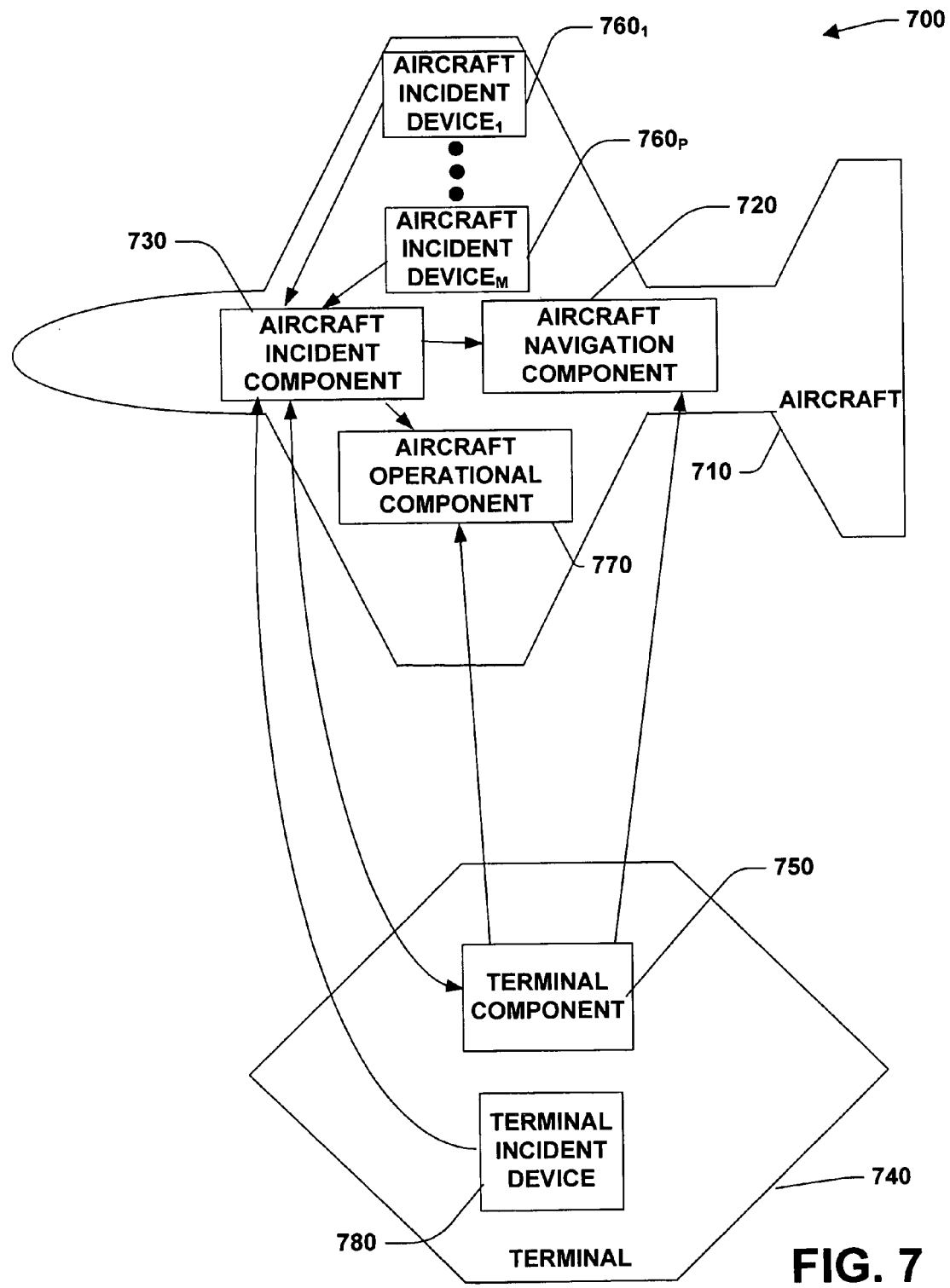
FIG. 7 is a schematic block diagram of an aircraft incident mitigation system in accordance with an aspect of the present invention.

Referring to FIG. 7, a system for mitigating an aircraft incident 700 is illustrated. The system 700 includes an aircraft 710, an aircraft navigation component 720, an aircraft incident component 730, a terminal 740, a terminal component 750 and a terminal incident device 780. Optionally, the system 700 can include an aircraft incident device $760_1$ through a Pth incident device $760_P$, P being an integer greater to or equal to one. The aircraft incident devices $760_1$ through $760_P$ can be referred to collectively as the incident device 760. The terminal 740 can include an air traffic control system (not shown), air traffic controller(s) (not shown) and/or other system(s) and component(s) related to air traffic control and/or navigation of aircraft. The aircraft 710 can include a commercial, military and/or other aircraft system having at least one human aboard. Optionally, the aircraft 710 can include can include an aircraft operational component 770 which facilitates operational system(s) (e.g., fuel, pneumatic control, hydraulic and/or air pressure) of the aircraft 710.

The aircraft incident component 730 facilitates identification of an incident. The incident can be related to a non-catastrophic situation, for example, loss of a redundant component such as an engine, an emergency, for example, a pilot becoming ill and/or a catastrophic situation. The aircraft incident component 730 can obtain information related to the incident from the terminal incident device 780 and/or the aircraft incident device 760. Accordingly, an incident can be initiated from the aircraft 710 and/or the terminal 740. For example, an air traffic controller can initiate an incident utilizing a terminal incident device 780 (e.g., button and/or switch) if an improper response (e.g., voice code, unrecognized voice, message and/or signal) is received from the aircraft 710. Once notified of the incident, the aircraft incident component 730 can communicate information associated with the incident to the aircraft navigation component 720 which can facilitate corrective and/or emergency course(s) of action. For example, the aircraft navigation component 720 can, at least temporarily, engage the auto-pilot system(s) in during an illness of a pilot. Further, the aircraft incident component 730 can communicate information associated with the incident to the terminal component 750 (e.g., identify incident to air traffic controller). Based upon at least in part upon communication of the incident from the aircraft incident component 730, the aircraft navigation component 720 can place the aircraft 710 into appropriate course of conduct (e.g., take air craft to a specific altitude, put aircraft on a certain flight plan—toward a specific location and/or permit the aircraft 710 to be navigated remotely).

Optionally, the aircraft incident component 730 can communicate information associated with the incident to the aircraft operational component 770. The aircraft operational component 770 can facilitate placing one, some or substantially all of the aircraft operational system(s) to a predetermined state and/or a state based at least in part upon information received from the terminal component 750 and/or aircraft incident component 730.

In view of the exemplary systems shown and described above, methodologies which may be implemented in accordance with the present invention, will be better appreciated with reference to the flow charts of FIGS. 8, 9, 10 and 11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. In addition, it will be appreciated that the exemplary methods 700, 800, 900 and 1000 and other methods according to the invention may be implemented in association with the aircraft incident mitigating system illustrated and described herein, as well as in association with other systems and apparatus not illustrated or described.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 8:
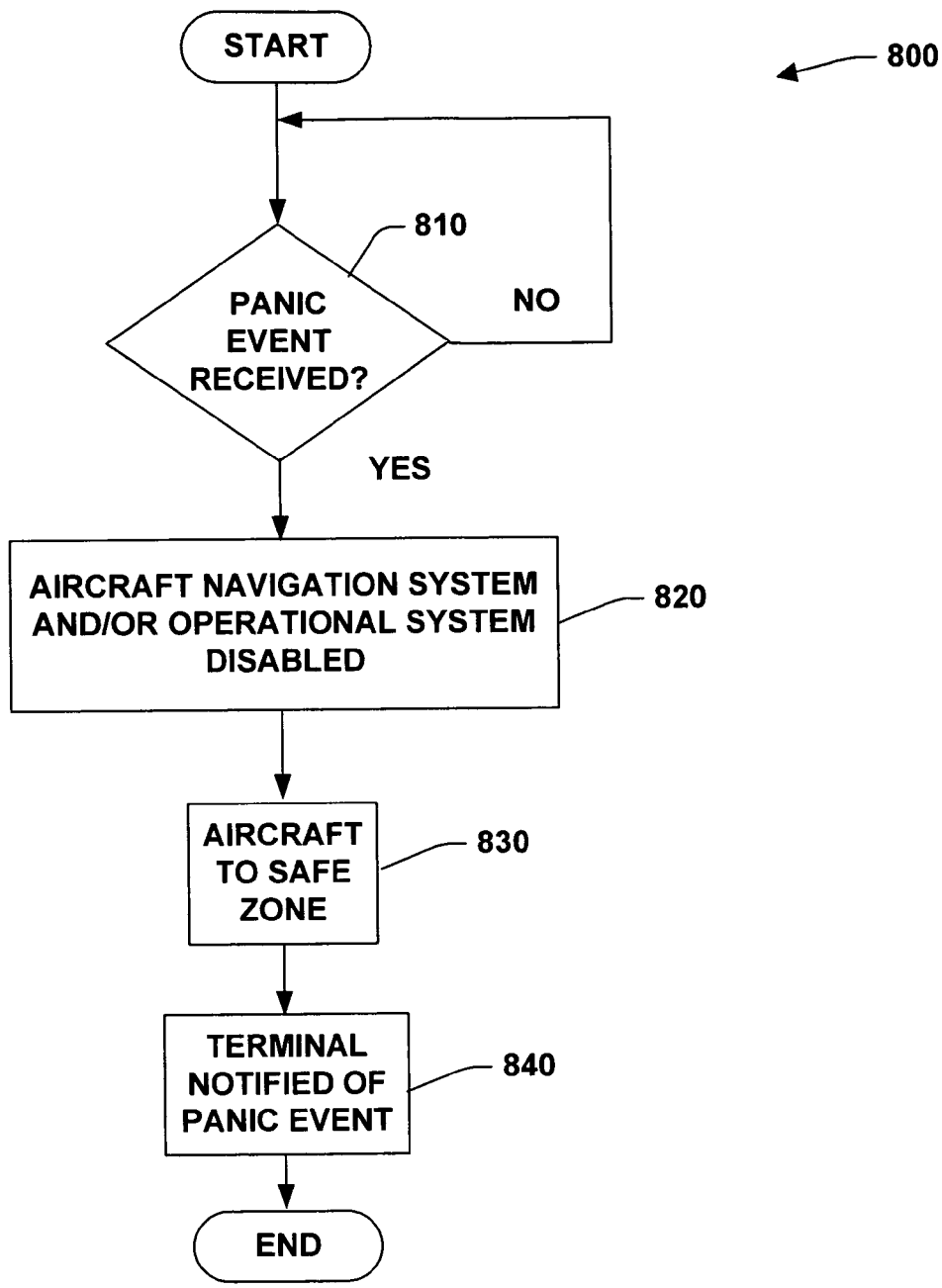
FIG. 8 is a flow chart illustrating a methodology for mitigating an aircraft incident content in accordance with an aspect of the present invention.

Turning to FIG. 8, a methodology 800 for mitigating an aircraft incident in accordance with an aspect of the present invention is illustrated. At 810, a determination is made whether a panic event has been received. If the determination at 810 is NO, processing continues at 810. If the determination at 810 is YES, at 820, the aircraft navigation and/or operational system(s) are disabled—partially or substantially completely. At 830, the aircraft is sent to a safe zone (e.g., based upon a safe zone component and/or an aircraft panic component). At 840, a terminal is notified of the panic event.

Figure 9:
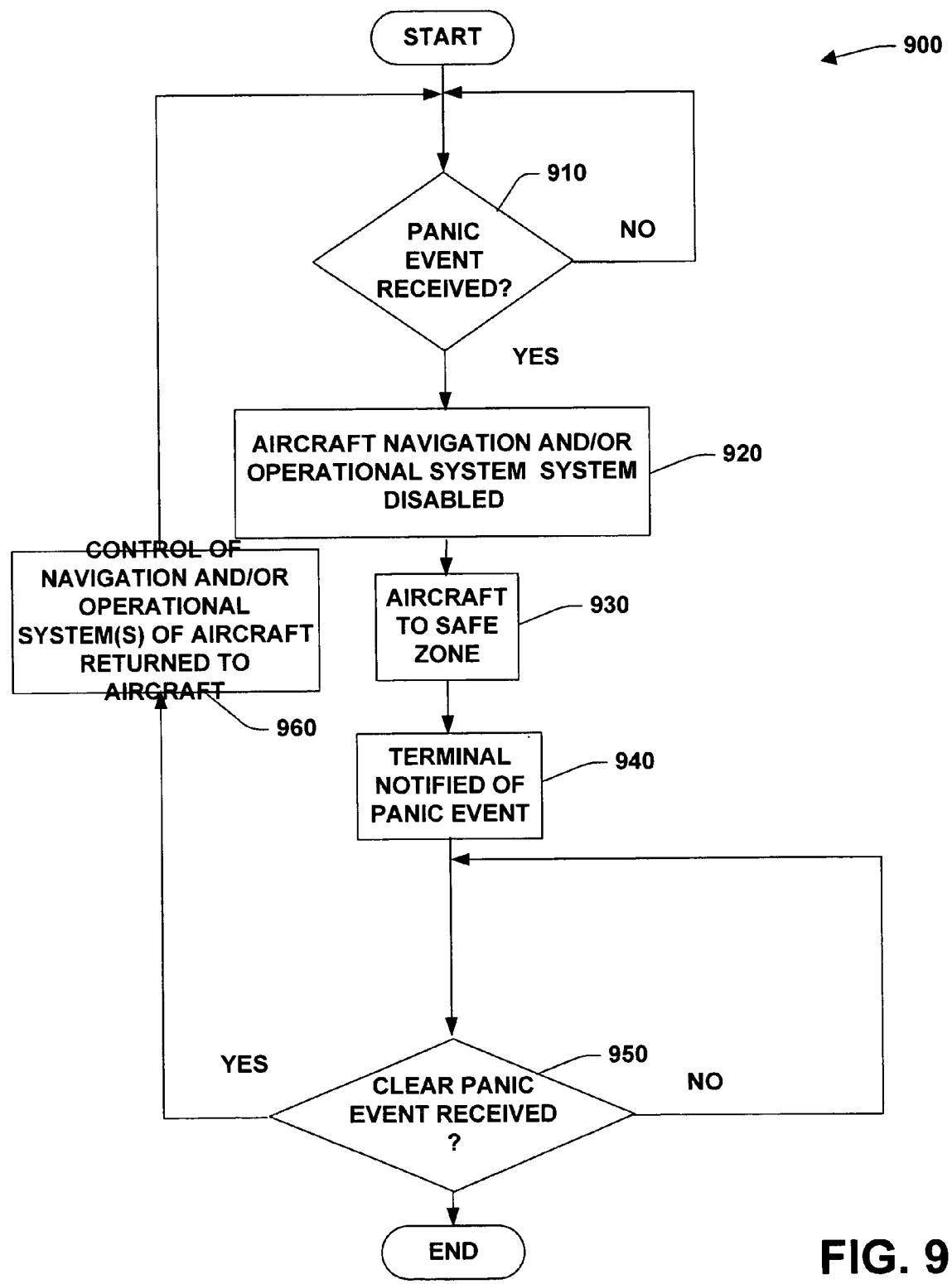
FIG. 9 is a flow chart illustrating a methodology for mitigating an aircraft incident content in accordance with an aspect of the present invention.

Referring to FIG. 9, a methodology 900 for mitigating an aircraft incident in accordance with an aspect of the present invention is illustrated. At 910, a determination is made whether a panic event has been received. If the determination at 910 is NO, processing continues at 910. If the determination at 910 is YES, at 920, the aircraft navigation and/or operational system(s) are disabled. At 930, the aircraft is sent to a safe zone (e.g., based upon a safe zone component and/or an aircraft panic component). At 940, a terminal is notified of the panic event. At 950, a determination is made whether a clear panic event message has been received (e.g., from the terminal). If the determination at 950 is YES, at 960, control of the navigation and/or operational system(s) of the aircraft are returned to the aircraft and processing continues at 910. If the determination at 950 is NO, processing continues at 950.

Figure 10:
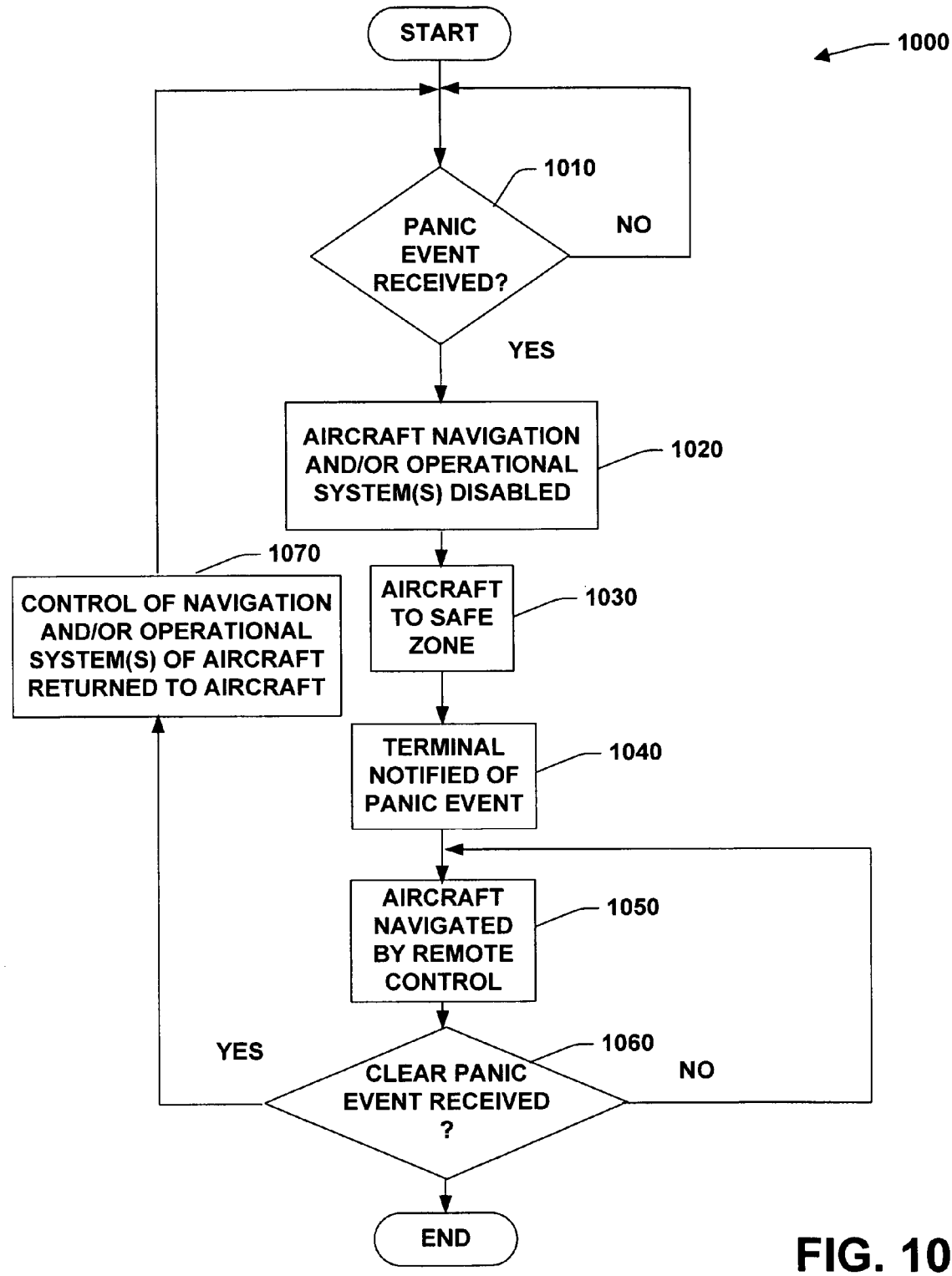
FIG. 10 is a flow chart illustrating a methodology for mitigating an aircraft incident content in accordance with an aspect of the present invention.

Next, referring to FIG. 10, a methodology 1000 for mitigating an aircraft incident in accordance with an aspect of the present invention is illustrated. At 1010, a determination is made whether a panic event has been received. If the determination at 1010 is NO, processing continues at 1010. If the determination at 1010 is YES, at 1020, the aircraft navigation and/or operational system(s) are disabled. At 1030, the aircraft is sent to a safe zone (e.g., based upon a safe zone component and/or an aircraft panic component). At 1040, a terminal is notified of the panic event. At 1050, the aircraft is navigated by remote control (e.g., from the terminal and/or a aircraft incident control center). At 1060, a determination is made whether a clear panic event message has been received. If the determination at 1060 is YES, at 1070, control of the navigation and/or operational system(s) of the aircraft are returned to the aircraft and processing continues at 1010. If the determination at 1060 is NO, processing continues at 1050.

Figure 11:
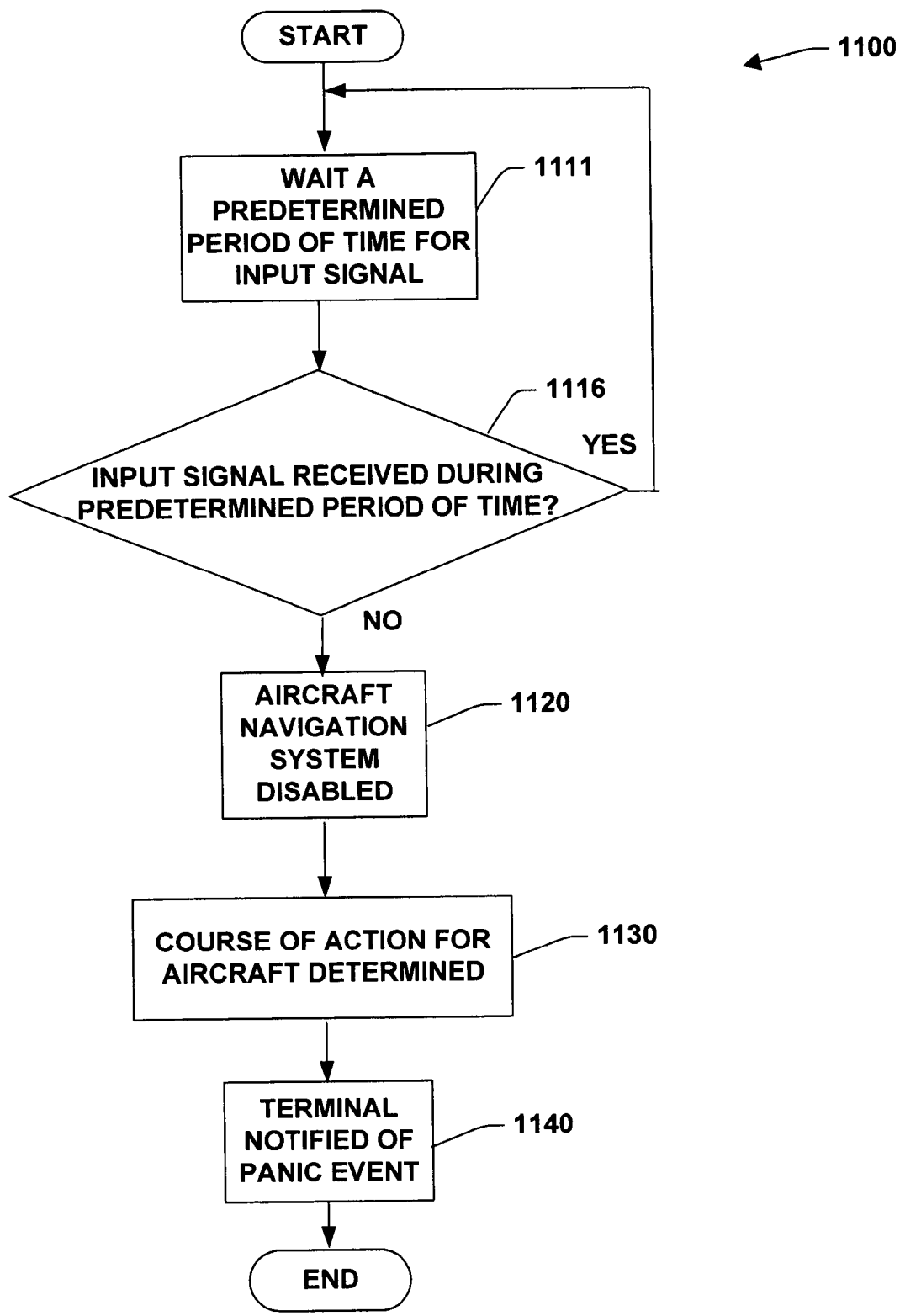
FIG. 11 is a flow chart illustrating a methodology for mitigating an aircraft incident content in accordance with an aspect of the present invention.

Turning to FIG. 11, a methodology 1100 for mitigating an aircraft incident in accordance with an aspect of the present invention is illustrated. At 1110, a predetermined period of time (e.g., 11 minutes) is waited. At 1116, a determination is made whether an input signal (e.g., appropriate operator iris scanned, thumb print detected, voice signal received, button depressed and/or other affirmative action) has been received during the predetermined period of time. If the determination at 1116 is YES, processing continues at 1110. If the determination is NO, at 1120, the aircraft navigation system, at least partially, is disabled (e.g., a panic event declared). At 1130, a course of action for the aircraft is determined (e.g., based upon a safe zone component and/or an aircraft panic component). At 1140, a terminal is notified of the panic event.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. An aircraft incident mitigation system comprising:
an aircraft panic component and a panic device, located on an aircraft, the aircraft panic component configured to:
receive a panic signal notification from the panic device of a panic situation originating within the aircraft;
cancel, based on receipt of an override signal activated by a crew member, the panic signal notification; and
transfer, based on no override signal being activated by a crew member within a time period, at least partial control of the aircraft to a remotely located aircraft control component.

2. The system of claim 1, the panic device comprising at least one of an iris scanner or a finger print reader.

3. The system of claim 1, the panic device is configured to communicate wireles sly with the aircraft panic component.

4. The system of claim 1, wherein the panic device is located in at least one of a cockpit, a galley or a cabin of the aircraft.

5. The system of claim 1, wherein the override signal is to be received within a predetermined time from the panic situation notification.

6. The system of claim 1, wherein the remotely located aircraft control component is operable by at least one of an automated system or an air traffic controller.

7. The system of claim 1, wherein the aircraft panic component is further configured to receive navigation instructions from the remotely located aircraft control component.

8. The system of claim 1, wherein remote control of the aircraft is terminated upon receipt, at the aircraft panic component, of a signal from the remotely located aircraft control component.

9. A method of mitigating an aircraft incident comprising:
receiving notification of a panic situation occurring on an aircraft, wherein the panic situation notification being received from a panic device located on the aircraft;

cancelling, based on receiving an override signal being activated by a crew member within a time period, the panic situation notification; and initiating, based on no override signal being received within the time period, transfer of at least partial control of the aircraft to remotely located operation.

10. The method of claim 9, further comprising determining that no override signal has been received based on a predefined period of time from the notification of the panic situation occurring.

11. The method of claim 9, wherein the initiating the transfer of the at least partial control to the remotely located operation includes initiating the transfer to at least one of an automated system or an air traffic controller.

12. The method of claim 9, further comprising receiving navigation instructions from the remotely located operation.

13. A system mitigating an aircraft incident comprising:
a computer-readable storage medium comprising computer executable instructions that, in response to execution by a computing system, cause the computing system to perform operations comprising:
receiving notification of a panic situation occurring on an aircraft, wherein the panic situation notification being received from a panic device located on the aircraft;

cancelling, based on receiving an override signal being activated by a crew member, the panic situation notification; and transferring, based on a pre-defined condition of no override signal being received, at least partial control of the aircraft to remotely located operation.

14. The system of claim 13, wherein the transferring includes transferring at least partial control to the remotely located operation based on a predefined period of time from the notification of the panic situation expiring.

15. The system of claim 13, an operation further comprising determining that no override signal has been received based on a predefined period of time from the notification of the panic situation occurring.

16. The system of claim 1, wherein the panic device is located in at least one of a galley or a cabin of the aircraft.

17. The method of claim 9, wherein the panic device being located in at least one of a cockpit, a galley or a cabin of the aircraft.

18. The system of claim 13, wherein the panic device being located in at least one of a cockpit, a galley or a cabin of the aircraft.

* * * * *